Feb. 23, 1943.　　　　H. Z. GORA　　　2,311,748
TIRE VALVE
Filed July 16, 1941
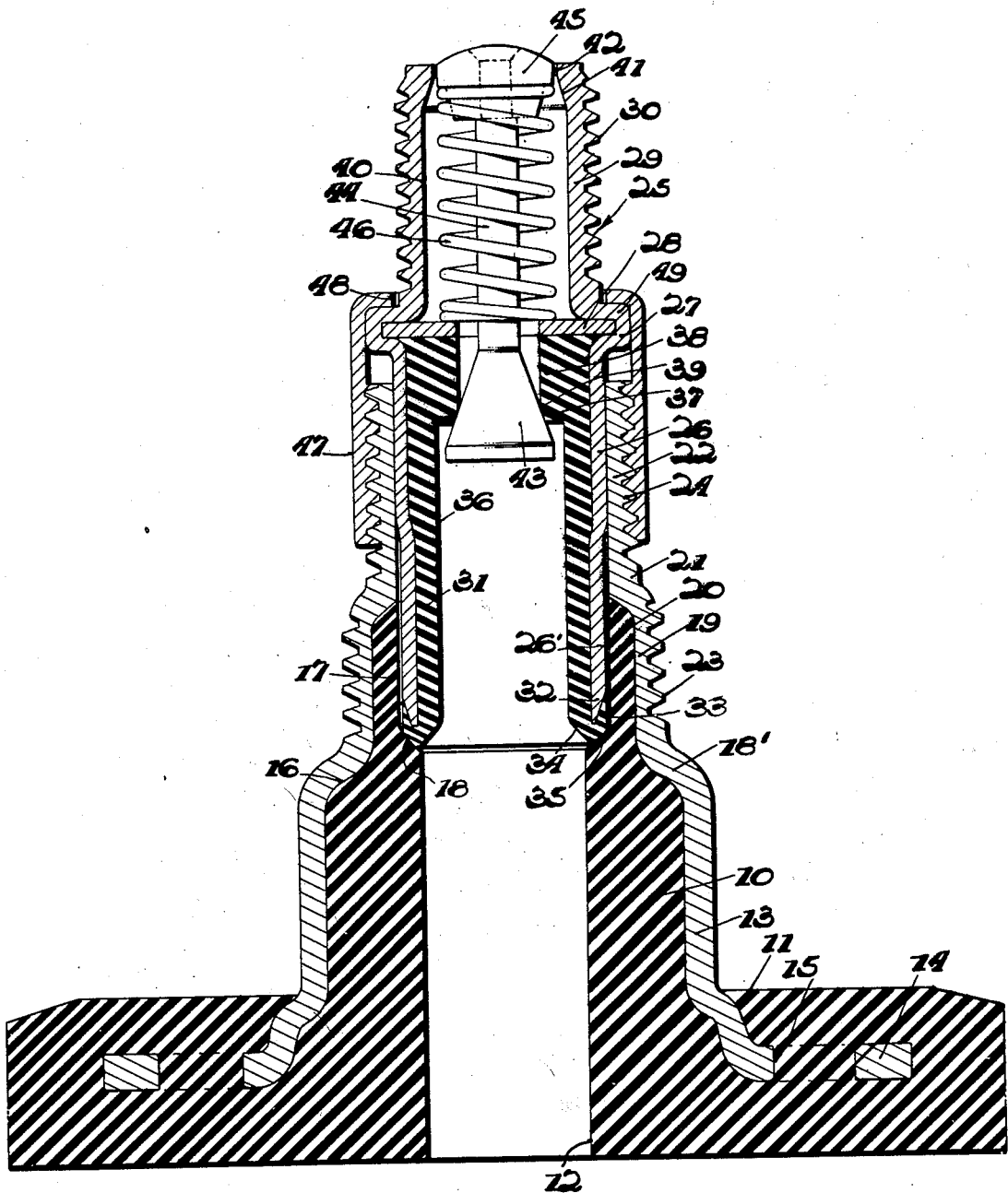
Inventor
Henry Z. Gora.
By Cameron, Kerkam + Sutton
Attorneys Patented Feb. 23, 1943

2,311,748

UNITED STATES PATENT OFFICE 2,311,748

TIRE VALVE

Henry Z. Gora, Bridgeport, Conn., assignor to Jenkins Bros., New York, N. Y., a corporation of New Jersey Application July 16, 1941, Serial No. 402,674

7 Claims. (Cl. 277—42)

This invention relates to tire valves, particularly valves for use on heavy duty tires, as on trucks, busses, etc., but more especially to tire valves for use on tractors and the like.

It is an object of this invention to provide a novel tire valve wherein the valve core is comprised in a readily attachable and detachable unit that is easy to apply to and remove from the body of the valve stem proper.

Another object of this invention is to provide a device of the type just characterized wherein the separable unit is so associated with the valve stem proper that leakage of fluid around said unit is substantially prevented.

Another object of this invention is to provide a device of the type characterized wherein the unit itself makes fluid tight sealing contact at its inner extremity with the body of the valve stem proper.

Another object of this invention is to provide a device of the type characterized wherein the body of the valve stem is composed of rubber reinforced substantially throughout its length by a metal member with which is associated the means whereby said unit may be readily attached to and detached from the valve stem body.

Another object of this invention is to provide a device of the type characterized wherein the said unit is provided with an interior rubber lining which is formed to provide a valve seat and which is so associated with the tubular metal member constituting the exterior wall of said unit as to cooperate with the rubber body portion of the stem in maintaining a fluid tight seal between said unit and the body of the valve stem.

Another object of this invention is to provide a device of the type last characterized wherein said rubber lining is so associated with said metal member as to prevent fluid getting between said lining and said member.

Another object of this invention is to provide a device of the type characterized wherein the said unit may be firmly locked in position by the engagement therewith of a sleeve threaded onto the metal reinforcing member of the body of the valve stem and which unit, upon removal of said sleeve, may be applied to and withdrawn from the valve stem proper by a mere telescopic movement of said unit with respect to said body.

Another object of this invention is to provide a device of the type last characterized wherein the cooperation of said threaded ring with said unit assists in maintaining a fluid tight seal between the said unit and the rubber body portion of the valve stem.

Another object of this invention is to provide a device of the type characterized wherein the valve member itself with its associated pin, head and spring may be readily replaced after the said unit is removed from the valve stem proper if such is found to be desirable.

Another object of this invention is to provide a device of the type characterized wherein a seal is effected by contacting rubber members which may be of different compositions or physical characteristics, as by different degrees of curing, vulcanization, etc., to the end that maximum sealing effectiveness may be obtained between the members, particularly when the tube is filled with water, as is common practice with tires for tractors.

Another object of this invention is to provide a device of the type characterized wherein the core is readily removable to facilitate and expedite loading and unloading operations by the presence of a clear unobstructed passage.

Another object of this invention is to provide a device of the type characterized wherein the constituent parts are relatively inexpensive to manufacture and easy to assemble and disassemble.

Another object of this invention is to provide a device of the type characterized which affords a highly efficient check valve for heavy duty tires, and which is strong and durable so as to provide maximum life at small expense, while employing a valve core that may be easily and expeditiously assembled with and disassembled from the valve stem proper.

Other objects will appear as the description of the invention proceeds.

The invention is capable of receiving a variety of mechanical expressions one of which is illustrated on the accompanying drawing, but it is to be expressly understood that the drawing is for purposes of illustration only, and is not to be construed as a definition of the limits of the invention, reference being had to the appended claims for that purpose.

The drawing illustrates in axial section a preferred embodiment of the present invention.

Referring in detail to said drawing, the valve stem proper is shown as composed of a rubber body portion 10 formed integrally with the usual or any suitable flap 11 and as having a through passage 12. Permanently united, as by vulcanization, with said rubber body portion 10 is a reinforcing tubular metal member 13 which has at its inner extremity an outwardly extending flange 14 embedded in the flap 11 and preferably provided with apertures 15 extending through said flange so that the rubber of the flap at opposite sides of the flange is integrally united by means of the rubber joined through said apertures 15.

As shown, the rubber body portion 10 is reduced in diameter exteriorly to provide a shoulder at 16, and interiorly, at or adjacent to said shoulder 16, the passage 12 through the stem is enlarged in diameter, as shown at 17, the two sections of said passage of different diameter being connected by a conical surface 18, here shown as disposed at an angle of approximately 45° to the axis of the stem. Said tubular reinforcing member 13 closely surrounds the rubber body portion 10, and is itself reduced in diameter, both exteriorly and interiorly as shown at 18', to conform with the shoulder 16, a second tubular portion 19 extending from said shoulder 16 and closely surrounding the extension 20 on said rubber body portion. Beyond said extension 20 said tubular reinforcing member 13 is again reduced in diameter, both exteriorly and interiorly as shown at 21, and extends to its own extremity in a third tubular portion 22. The inner diameter of the extension 20 on the rubber body portion is preferably of the same inner diameter as the portion 22 on the metal reinforcing member, so that the rubber of said extension 20 merges smoothly into the bore of said portion 22. The said tubular metal reinforcing member 13 is thus in contact with the exterior of the rubber body portion of the stem from the flap to the extremity of said rubber body portion, the rubber preferably being vulcanized to said tubular metal member 13 throughout, while interiorly the bore of the portion 22 at the outer extremity of said member 13 is preferably continuous with the bore 17 of the extension 20 of said rubber body portion as far as the tapered or conical surface 18. The intermediate portion 19 of said metal reinforcing member 13 may be provided with threads as shown at 23, and said extension 22 is also threaded as shown at 24 for a purpose to be explained.

The valve stem proper as so far described is designed to receive by a simple telescopic movement a readily insertable and removable valve core unit in the form of a confining metallic shell which has a rubber lining sealed thereto that also provides an integral rubber valve seat, and which also contains as a separable subunit a valve member, valve pin, valve head and spring assembly.

As shown said unit includes a metallic shell 25 having an inner portion 26 whose exterior diameter is such that it slides tightly within the bore of the portion 22 of the reinforcing member 13, said tubular portion 26 being somewhat reduced in diameter adjacent its extremity as shown at 26' so that it is out of contact with at least the inner face of the rubber extension 20. Intermediate its length said metallic shell 25 is bent outwardly and then inwardly as shown at 27 so that an apertured disk 28 of metal or other suitable material may be firmly locked therein by upsetting said shell, or said shell may be formed as illustrated and said disk 28 sprung into the groove formed by said reversely bent portion 27. The outer portion 29 of said shell 25 is shown as of somewhat reduced external diameter and of proper size for ready cooperation with the sleeve or chuck of conventional couplings used in the inflation of tires. As shown said portion 29 may be threaded, as indicated at 30, to enable the usual chuck to be attached thereto.

The inner portion of the shell 25 from the ledge provided by the disk 28 to the inner extremity of said portion is lined with rubber 31, preferably vulcanized thereto, the extremity of the shell portion 26' being tapered as shown at 32 and the rubber 31 being extended around said tapered portion 32, as shown at 33, so that said tapered portion 32 is embedded in the rubber at the inner extremity of the removable unit. The outer diameter of the rubber portion 33 is preferably the same as the outer diameter of the portion 26' of the shell, while the innermost extremity of the rubber is tapered in both directions as shown at 34 and 35, the latter surface preferably being in substantial conformity with the bevel of the surface 18 so that when the unit is forced inwardly the surfaces 18 and 35 provide a rubber to rubber fluid tight annular seal. Hence the chance of fluid under pressure leaking around the shell 25 is minimized, while the manner of attachment of the rubber lining 31 to the inner portion of the shell 25 prevents fluid under pressure from stripping the rubber lining 31 from the shell 25.

The passage 36 within the lining 31 is abruptly reduced in cross section by an inwardly directed shoulder 37, and the passage is then continued in a bore of smaller diameter 38. Surfaces 37 and 38 meet in an oblique angle at 39 to constitute a valve seat for the valve member to be described. Lining 31 is preferably molded into the shell 25 after the disk 28 is in position and said lining 31 is preferably vulcanized to both the disk 28 and the shell 25.

The passage 40 through the outer portion 29 of the shell 25 is, for the greater part of its length, somewhat larger than the aperture in the disk 28 which latter may be of the same size as the passage 38. Thereby a shoulder is provided as an abutment for a spring as to be explained. The outer extremity of said passage 40 is suitably reduced in cross section, as by the tapered surface 41 leading to the opening 42 at the extremity of the shell 25, for a purpose to be explained.

Mounted within said unit as so far described is a frusto-conical valve member 43 which may be attached to or formed integrally with a valve pin 44 that, at its outer extremity, carries a head 45 whose diameter is substantially the same as the inner diameter of the aperture 42, only a small working clearance being left therebetween so that said head 45 may slide freely in said opening 42 and yet close said opening 42 to prevent the ingress of dust and dirt. Head 45 may be attached to a pin 44 in any suitable way as by heading over the extremity of said pin where its portion of reduced diameter is passed through an opening in said head. Interposed between said head 45 and the ledge provided by the disk 28 is a coil spring 46 which normally holds the valve member 43 in sealing contact with the valve seat 39, with the head 45 occupying the aperture 42. When the head is depressed the valve member is moved away from its seat 39 while fluid may flow freely around the head 45 because of the enlargement of the passage 40 due to the tapered surface at 41.

Valve member 43 is preferably frusto-conical in form with its conical wall making a sharp angle with both of the rubber surfaces 37 and 38. Hence contact with the valve seat 39 approximates a line contact, but the conical surface of said valve member, under the action of the spring 46, may wedge itself into 360° of contact with the rubber valve seat by broadening the contact as necessary to effect a fluid tight seal. Valve member 43 is preferably made of metal.

Where as in the preferred use for which the present invention is employed the stem is associated with a tractor tire, the seal effected at the contacting surfaces 18, 35 is preferably a rubber to rubber seal. It is common practice to fill a tractor tire with water, but as the tire cannot be completely filled with water there is always air present. Experience has demonstrated that a rubber to rubber contact provides a more effective and satisfactory seal in the presence of both air and water. If desired, the contacting rubber members may have different degrees of rigidity, hardness or other characteristics, the rubber of the respective members being made of different compositions or the desired differential characteristics being effected by different degrees of curing, vulcanizing, etc.

To retain the unit composed of the shell 25 and its contained parts within the reinforcing member 13, with its inner extremity in sealing contact with the surface 18, an interiorly threaded sleeve 47 is provided for cooperation with the threads 24 before referred to, the outer extremity of said sleeve being inwardly flanged as shown at 48 so as to engage the outer surface 49 provided by the reversely bent portion 27 of the shell 25. Sleeve 47 has its aperture sufficiently large so that it may be passed easily over the end portion 29 of shell 25, and it may be given any desired or suitable exterior configuration to facilitate manipulation thereof. By tightening said sleeve 47 on the threads 24 the unit may be telescopically forced inwardly to assure an effective seal at the surfaces 18, 35.

It will therefore be perceived that the valve core is in the form of a readily insertable and withdrawable metallic shell 25 which may be applied to the body of the valve stem proper by a simple telescopic insertion, whereupon said unit may be firmly locked in position by manipulation of the threaded sleeve 47. The tightening of said sleeve 47 not only prevents displacement and escape of the valve core unit, but assures that the inner extremity of said unit shall make sealing contact with the rubber of the valve stem body, preventing leakage around said unit.

The unit composed of the shell 25 with its rubber lining 31 which provides the valve seat 39, and the subunit composed of valve member 43, pin 44, head 45 and spring 46, thus constitute a self-contained unit which may be readily applied and removed as desired, while said subunit may be readily removed from said shell when replacement is desired. The structure so provided is composed of relatively simple parts that are easy to fabricate and assemble, and the entire structure provides a simple but highly effective and efficient valve assembly that is particularly useful for heavy duty tires, especially truck tires.

While the embodiment of the invention illustrated on the drawing has been described with considerable particularity it is to be expressly understood that the invention is not restricted thereto, as the same is capable of receiving a variety of mechanical expressions, some of which will now be apparent to those skilled in the art, while changes may be made in the details of construction, arrangement and proportion of parts, in the form of the cooperating elements, and in the materials used, and certain features may be used without other features, without departing from the spirit of this invention. Reference is therefore to be had to the appended claims for a definition of the invention.

What is claimed is:

1. In a valve stem of the type adapted for heavy duty tires and which includes a tubular body comprising a rubber portion reinforced by an exterior tubular metal member, a readily insertable and removable valve core unit including a shell insertable slidably into the outer end of said reinforcing member and having an intermediate exteriorly projecting shoulder, a flanged sleeve threaded on said reinforcing member and cooperating with said shoulder to retain said unit within said body, a rubber lining for the inner portion of said shell providing a valve seat, and a valve core retained in said shell and removable and insertable with said unit.

2. In a valve stem of the type adapted for heavy duty tires which includes a tubular body comprising a rubber portion reinforced by a tubular metal member, a readily insertable and removable valve core unit including a shell insertable rectilinearly into said reinforcing member and having an intermediate exteriorly projecting shoulder, a sleeve threaded on said reinforcing member and cooperating with said shoulder to retain said unit within said body, a rubber lining fixed in the inner portion of said shell and movable therewith, the said shell having a tapered extremity and the inner extremity of said rubber lining embracing said tapered extremity whereby the extremity of said shell is embedded in the rubber of said lining, and a valve core retained in said shell and removable and insertable with said unit.

3. In a valve stem of the type adapted for heavy duty tires which includes a tubular body comprising a rubber portion reinforced by a tubular metal member, a readily insertable and removable valve core unit including a shell insertable rectilinearly into said reinforcing member and having an intermediate exteriorly projecting shoulder, a sleeve threaded on said reinforcing member and cooperating with said shoulder to retain said unit within said body, a rubber lining for the inner portion of said shell, said rubber body portion being provided with a shoulder and the inner extremity of said rubber lining being held in sealing contact with said last mentioned shoulder when said threaded sleeve is tightened on said first named shoulder, and a valve core retained in said shell and removable and insertable with said unit.

4. In a valve stem of the type adapted for heavy duty tires which includes a tubular body comprising a rubber portion reinforced by a tubular metal member, a readily insertable and removable valve core unit including a shell insertable rectilinearly into said reinforcing member and having an intermediate exteriorly projecting shoulder, a sleeve threaded on said reinforcing member and cooperating with said shoulder to retain said unit within said body, a rubber lining for the inner portion of said shell, said rubber body portion being provided with an inwardly inclined shoulder and said rubber lining being provided with a rubber extremity in which the extremity of said shell is embedded and which is held in sealing contact with said last named shoulder when said threaded sleeve is tightened on said first named shoulder, and a valve core retained in said shell and removable and insertable with said unit.

5. In a valve stem of the type adapted for heavy duty tires which includes a tubular body comprising a rubber portion reinforced by a tubular metal member, a readily insertable and removable valve core unit including a shell insertable rectilinearly into said reinforcing member and having an intermediate exteriorly projecting shoulder, a sleeve threaded on said reinforcing member and cooperating with said shoulder to retain said unit within said body, a spring abutment disk in said shell, said shell being reversely bent to embrace the periphery of said disk and said reversely bent portion of said shell providing said shoulder for cooperation with said threaded sleeve, a rubber lining for the inner portion of said shell, and a valve core retained in said shell and removable and insertable with said unit.

6. In a valve stem of the type adapted for heavy duty tires which includes a tubular body comprising a rubber portion reinforced by an exterior tubular metal member, a readily insertable and removable valve core unit including an open ended shell insertable slidably into the outer end of said reinforcing member and having an intermediate exteriorly projecting shoulder, a sleeve threaded on said reinforcing member and cooperating with said shoulder to retain said unit within said body, a spring abutment within said shell, a rubber lining for the inner portion of said shell providing a valve seat, a valve member cooperating with said valve seat, a valve pin projecting from said valve member, a head on said pin substantially filling the opening at the end of said unit, and a coil spring reacting between said head and said abutment.

7. In a valve stem of the type adapted for heavy duty tires which includes a tubular body comprising a rubber portion reinforced by a tubular metal member, a readily insertable and removable valve core unit including an open ended shell insertable rectilinearly into said reinforcing member and having an intermediate exteriorly projecting shoulder, a sleeve threaded on said reinforcing member and cooperating with said shoulder to retain said unit within said body, said shell having a reversely bent intermediate portion forming said projecting shoulder, a disk locked in said reversely bent portion, a rubber lining for said shell extending from said disk to and embracing the inner extremity of said shell and providing a sealing surface for engagement with a shoulder on said rubber body portion, said lining providing a valve seat, and a valve core in said shell including a valve member for cooperation with said seat, a pin projecting from said valve member, a head secured to said pin and substantially filling the opening in the outer end of said shell and a spring reacting between said head and said disk and normally urging said valve member into sealing contact with said valve seat.

HENRY Z. GORA.